Oct. 18, 1966   E. P. BRINKEL   3,279,484
PRESSURE CONTROL SYSTEM
Filed April 5, 1963   4 Sheets-Sheet 1

INVENTOR.
Edwin P. Brinkel.
BY
Harness, Dickey & Pierce
ATTORNEYS.

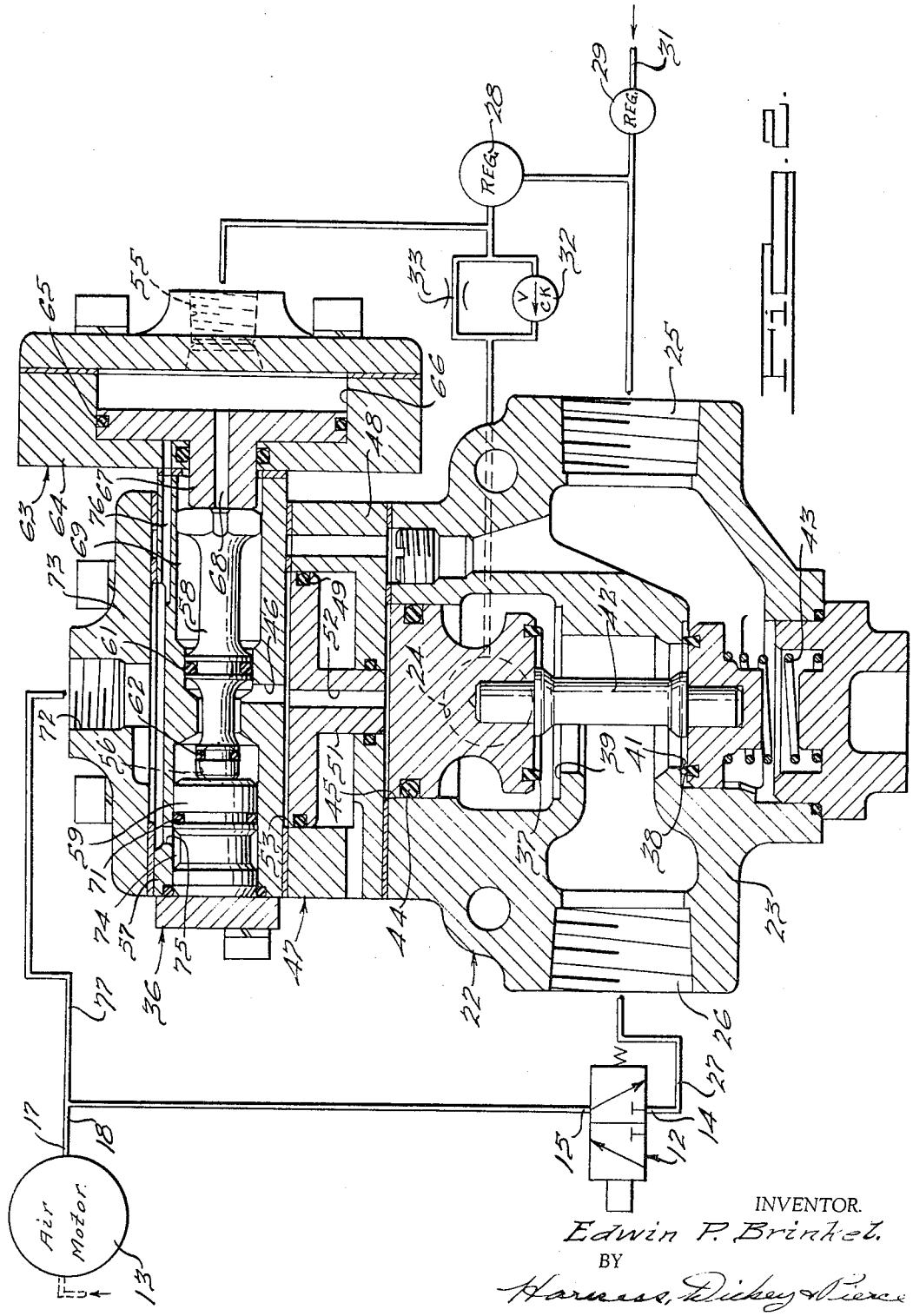

Oct. 18, 1966  E. P. BRINKEL  3,279,484
PRESSURE CONTROL SYSTEM
Filed April 3, 1963  4 Sheets-Sheet 3

INVENTOR.
Edwin P. Brinkel.
BY
Harness, Dickey & Pierce
ATTORNEYS.

Oct. 18, 1966    E. P. BRINKEL    3,279,484
PRESSURE CONTROL SYSTEM
Filed April 3, 1963    4 Sheets-Sheet 4

INVENTOR.
Edwin P. Brinkel.
BY
Harness, Dickey & Pierce
ATTORNEYS.

3,279,484
PRESSURE CONTROL SYSTEM
Edwin P. Brinkel, Royal Oak, Mich., assignor to Ross Operating Valve Company, Detroit, Mich., a corporation of Michigan
Filed Apr. 3, 1963, Ser. No. 270,360
14 Claims. (Cl. 137—37)

This invention relates to pressure control systems, and more particularly to control systems for permitting air motors such as those used for power-driven nut wrenches to operate at low pressure until the nuts are run up to an initially engaged position, and then at a predetermined high pressure to tighten the nuts with a specific torque.

It is an object of the invention to provide a novel and improved pressure control system of this type which is efficient and reliable in operation, and automatically shifts from low to high pressure upon cessation of low pressure operation.

It is another object, in several forms of the invention, to provide an improved system of this character which, in the event one or more of a group of simultaneously driven nuts temporarily jams before it reaches its initially engaged position, will shift to high pressure until the jammed nut is dislodged and then back to low pressure until the dislodged nut is run up to its initially engaged position, thus avoiding a high pressure drive of the dislodged nut which might develop excessive final nut torque.

It is also an object, in several forms of the invention, to provide an improved pressure control system with these characteristics, in which relatively small pressure regulators may be used for the high and low pressure air supplies.

Other objects, features, and advantages of the present invention will become apparent from the subsequent description, taken in conjunction with the accompanying drawings, in which:

FIGURE 2 is a partially schematic cross-sectional view of the pilot valve and selector valve, showing their connections with the regulators, control valve and air motor;

Briefly, each of the illustrated embodiments of the invention comprises a selectively operable control valve disposed between a fluid supply means having low and high pressure settings and an air motor such as is used on a multiple nut wrench. In the first and second embodiments of the invention, the fluid supply means comprises a selector valve having available a high pressure and a low pressure supply and with its outlet connected to the selectively operable control valve. In the third and fourth embodiments of the invention, a pressure regulator of the self-relieving type comprises the variable source of fluid pressure, the pressure regulator being shiftable between high and low pressure settings and having its outlet connected to the control valve. In the third embodiment the shifting of the pressure regulator setting is controlled by a selector valve.

Shifting of the selector valve in the first, second and third embodiments is controlled by a pressure differential operated pilot valve. Shifting of the pilot valve is in turn controlled by its sensing of the cessation of fluid flow to the air motor, which will normally be when the nuts have been run to their initially engaged position under low pressure and the motor thereby stalled. The cessation of fluid flow will be accompanied by a disappearance of pressure differential between two points in the conduit system leading from the low pressure supply to the air motor, and this disappearance of pressure differential will cause the pilot valve to shift.

In the fourth embodiment, the selector valve is eliminated, this being accomplished by providing a spring in the regulator which gives it its low pressure setting. The regulator can thus be shifted from its low pressure to its high pressure setting directly in response to shifting of the pilot valve.

In the second, third and fourth embodiments, the points at which the pilot valve senses pressure differentials are so chosen that, should one or more nuts become jammed before reaching their initially engaged position, and should they become dislodged when high pressure is initially applied, low pressure will be reapplied so that the dislodged nuts will not be run home under high pressure. Excessive final torque on the nut will thus be avoided.

Figure 1:
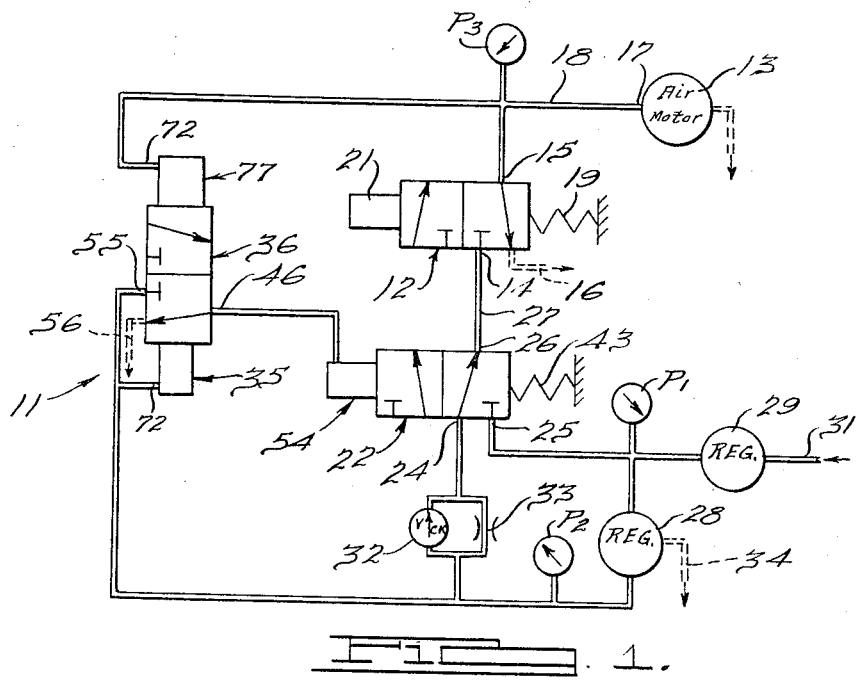
FIGURE 1 is a schematic view of one embodiment of the pressure control system.

Referring more particularly to the drawings, FIGURES 1 and 2 show a first embodiment of the invention which is generally indicated at 11 and comprises a three-way normally closed control valve generally indicated at 12 for controlling the operation of a fluid operated motor 13. This motor may, for example, be the air motor of a multiple nut wrench which is used to simultaneously rotate a plurality of nuts such as the nuts which hold an automobile wheel in place. It is one of the purposes of the invention to drive motor 13 in such a fashion as to insure that when all the nuts are fully tightened, they will have substantially the same tightness. In order to accomplish this result, it is desirable to drive motor 13 with relatively low air pressure until the nuts reach an initially engaged position, and only after reaching such position, to apply a predetermined high pressure to motor 13. In this manner, closer control over the final torque applied to the nut can be achieved than would be possible if motor 13 were driven with high fluid pressure throughout the period of nut travel, since in the latter case, the inertia of the rotating parts for the different nuts could vary through a wide range, the nuts being thus jammed home with substantially different torques.

Valve 12 is provided with an inlet port 14, an outlet port 15 and an exhaust port 16, outlet port 15 being connected with the inlet port 17 of air motor 13 by a conduit 18. Means such as a helical compression spring 19 is provided for urging valve 12 to its normally closed position, connecting ports 15 and 16. Selectively operable means 21, such as a solenoid or push button, is capable of being actuated to shift valve 12 to its open position, connecting ports 14 and 15.

In the embodiment of FIGURES 1 and 2, the pressure applied to port 14 of valve 12 is controlled by a selector valve generally indicated at 22. Valve 22 is a pressure-operated two-way valve with a housing 23 having a low pressure inlet port 24, a high pressure inlet port 25, and an outlet port 26, the latter being connected to inlet port 14 of control valve 12 by a conduit 27.

The supply of air to low pressure inlet port 24 of valve 22 is controlled by a pressure regulator 28, while the supply of high pressure air to port 25 is controlled by a pressure regulator 29. Both of these regulators may be supplied by a common supply line 31, with the high pressure being designated as $P_1$ and the low pressure as $P_2$, as indicated by the schematically shown gauges in FIGURE 1. A check valve 32 and a restriction 33 are connected in parallel between regulator 28 and port 24, and an exhaust port 34 is provided for regulator 28. Components 32, 33 and 34 are provided in order to retard the transmission of any pressure surge created by the shifting of valve 22 to the pressure-responsive area generally indicated at 35 of a pilot valve 36, the function of which is described below, and for the further purpose of relieving any over-pressure condition at port 24 during such shifting of valve 22. The arrangement is needed only because of the particular construction used for selector valve 22, namely, that of an open cross-over valve, which means that ports 24 and 25 will be momentarily connected to each other during shifting of valve 22.

Selector valve 22 comprises two poppet valve members 37 and 38, these members engaging valve seats 39 and 41 respectively, formed in housing 22. Valves 37 and 38 are carried by a stem 42 urged upwardly in FIGURE 2 (and to the left in FIGURE 1) by a spring 43, to a position in which valve member 38 engages seat 41, but valve member 37 is spaced from valve seat 39. This will have the effect of connecting ports 24 and 26 but disconnecting ports 25 and 26, thus supplying low pressure air to port 14 of control valve 12. A piston 44 is carried at the upper end of stem 42, this piston being slidable within a chamber 45 connected to the outlet port 46 of pilot valve 36. Pressurization of chamber 45 will shift valve 22 downwardly in FIGURE 2 (or to the right in FIGURE 1) to connect high pressure port 25 with outlet port 26 and disconnect low pressure port 24 therefrom.

A pressure booster assembly generally indicated at 47 is shown in FIGURE 2 as being mounted on housing 23 of selector valve 22. This assembly comprises a housing 48 having a piston 49 slidably mounted therein, the piston having an extension 51 engageable with the upper end of piston 44. A central bore 52 is provided in piston 49 and extension 51, this bore connecting chamber 45 with the chamber 53 within which piston 49 is disposed. Pilot valve 36 is mounted on pressure booster assembly 47, and outlet port 46 of pilot valve 36 is directly connected to chamber 53 and thus to chamber 45. The total effective area acting upon stem 42 will therefore be that of piston 49 plus that of piston 44; this total area is generally indicated at 54 in FIGURE 1.

Pilot valve 36 is a pressure differential operated three-way valve having an inlet port 55 and an exhaust port 56 in addition to outlet port 46. Valve 36 comprises a housing 57 mounted on housing 48 of pressure booster assembly 47, a spool 58 slidably mounted within housing 57 and a piston 59 slidably mounted within housing 57 in tandem with spool 58. Spool 58 carries an inlet valve member 61 and an exhaust valve member 62, and is movable between a left hand position as seen in FIGURE 2 in which outlet port 46 is connected to exhaust port 56, and a right hand position in which an inlet port 55 is connected to outlet port 46. The structure and function of valve 36 is described in greater detail in copending application Serial No. 154,990, filed November 27, 1961, by Daniel B. Abbott and Edwin P. Brinkel and entitled "Valve," said application being assigned to the same assignee as the present application, now Patent No. 3,131,-722, issued May 5, 1964.

Although inlet port 55 may be considered the pilot valve inlet port for purposes of the schematic diagram, it is actually carried by a pressure booster assembly for pilot valve 36, this assembly comprising a housing 64 mounted on the right hand side of housing 57, as seen in FIGURE 2, and carrying a piston 65. Piston 65 is slidably mounted within a chamber 66 in housing 64, port 55 being connected to chamber 66. An extension 67 carried by piston 65 is engageable with the right hand end of spool 58, and a central bore 68 extends through piston 65 and extension 67, connecting chamber 66 with a chamber 69 within housing 57. Pressure at inlet port 55 will thus act against the total area comprising the area of piston 65 plus the area of valve member 61 when the latter is in its closed postion; this total effective area is designated generally at 35 in FIGURE 1.

Piston 59 carries a seal area 71 connected to a signal port 72, this port being formed in a cover 73 on housing 57. Port 72 is connected to a chamber 74 to the left of seal area 71 by a passage 75, and is also connected by a passage 76 to the side of piston 65 opposite that which is exposed to chamber 66. The result will be that when pressure is applied to port 72 equal to that at port 55, the effect of piston 65 on spool 58 will be cancelled and the pressure on seal area 71, which is greater than the area of seal 61, will cause spool 58 to shift rightwardly from its FIGURE 2 position to a position applying pressure to outlet port 46. The difference in areas between seals 61 and 71, combined with the presence of booster assembly 63, will maintain spool 58 in its left hand position as long as the pressure at port 72 is less than that at port 55, and will return spool 58 from its right hand to its left hand position should the pressure differential between ports 72 and 55 reappear. The total area represented by the sum of the area on the left hand side of piston 65 in FIGURE 2 and seal are 71 is indicated generally at 77 in FIGURE 1.

Port 72 is connected to inlet port 17 of air motor 13. The pressure at port 17 is referred to as $P_3$ in FIGURE 1.

In operation of the embodiment of FIGURES 1 and 2, assuming an initial condition with the parts as shown in FIGURE 1, $P_2$ will be applied to inlet port 14 of control valve 12 and $P_3$ will be zero. Upon rightward shifting of control valve 12, air will flow to motor 13 from regulator 28, through ports 24 and 26 of selector valve 22, ports 14 and 15 of control valve 12 and port 17 of air motor 13. Because of the pressure drop through the flow path, $P_3$ will be substantially less than $P_2$. Since $P_2$ is connected to the area 35 and $P_3$ to area 77, pilot valve 36 will remain in its FIGURE 1 position.

Assuming that air motor 13 simultaneously rotates a plurality of nut wrenches connected to nuts only partially threaded and loosely rotatable on their respective studs or bolts, the relatively low pressure applied to air motor 13 will cause rapid advancing of the nuts to their initial engaging position. When they arrive at this position, they will be only slightly torqued because of the low pressure applied to air motor 13. However, when movement of air motor 13 stops, the substantial cessation of air flow will cause $P_3$ to build up to substantially the same pressure as $P_2$.

This will cause downward shifting of pilot valve 36 in FIGURE 1, or rightward shifting in FIGURE 2. Inlet port 55 of valve 36 will be connected to outlet port 46, applying pressure to area 54 of selector valve 22.

This will shift the selector valve rightwardly in FIGURE 1 and downwardly in FIGURE 2, connecting inlet port 25 of the selector valve to outlet port 26. Relatively high pressure $P_1$ will thus be applied through ports 14 and 15 of control valve 12 to port 17 of air motor 13. An increased but controlled torque will thus be applied to the nuts which are in their initially engaged position, tightening the nuts to a predetermined torque. The air volume requirements to apply full torque to the nuts is so slight that no appreciable pressure drop between $P_1$ and $P_3$ will be noticed, the nuts rotating only about ¼ or ½ turn with no appreciable air flow being required.

Upon release of selectively actuable element 21 of control valve 12, the control valve will shift back to its leftward positions as shown in FIGURE 1, dumping the pressure on area 77 of pilot valve 36. Since $P_2$ is still applied to area 35, the pilot valve will shift upwardly in FIGURE 1 or to the left in FIGURE 2, exhausting the pressure in chamber 54 of selector valve 22. The selector valve will thus shift to the left in FIGURE 1 or upwardly in FIGURE 2, again connecting $P_2$ to inlet port 14 of control valve 12 in readiness for another cycle.

Figure 3:
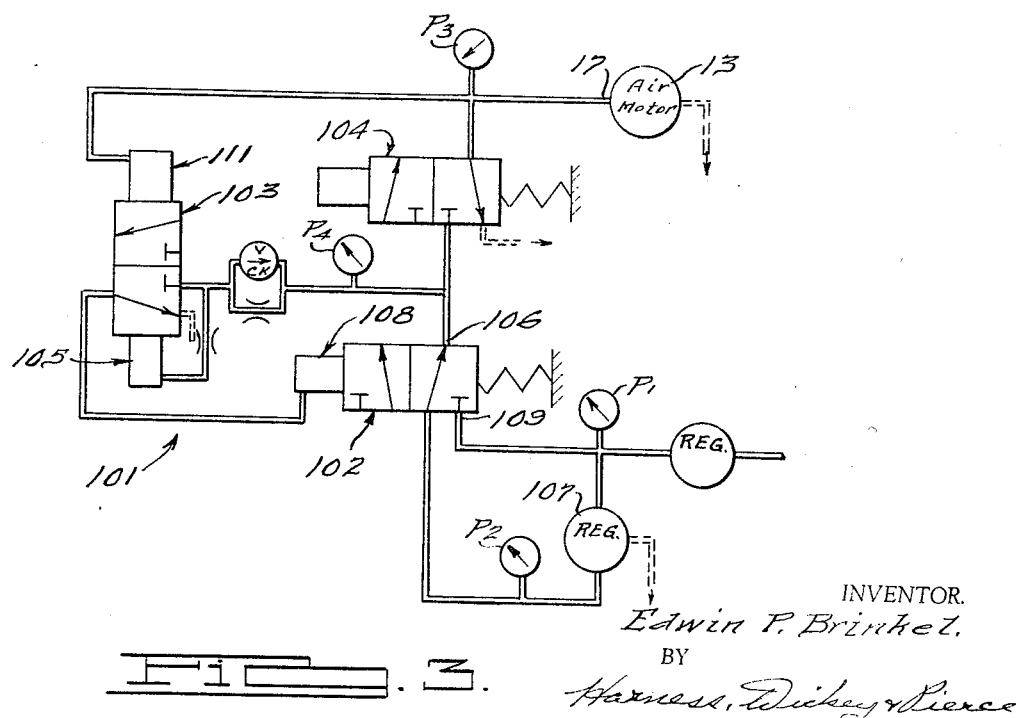
FIGURE 3 is a schematic view of another embodiment of the invention in which one side of the pilot valve is connected to the outlet of the selector valve.

FIGURE 3 shows another embodiment of the invention which is generally indicated at 101 and is basically similar to that of FIGURES 1 and 2, having a selector valve generally indicated at 102, a pilot valve generally indicated at 103 and a control valve generally indicated at 104. The only difference between the embodiments of FIGURES 1 and 3 is the fact that the pressure differential area of valve 103 generally indicated at 105 (corresponding to area 35 of valve 36 of FIGURE 1) is connected to outlet port 106 of valve 102 instead of to regulator 107 which supplies $P_2$. The pressure at port 106 is designated as $P_4$ in FIGURE 3.

In operation of the embodiment of FIGURE 3, valve 104 will be shifted to the right, connecting $P_2$ to air motor 13. When the nuts are rotated to their initially engaged position, $P_3$ will rise to $P_2$, shifting valve 103 downwardly and supplying pressure to area 108 of valve 102. This will shift valve 102 to the right in FIGURE 3, connecting high pressure inlet port 109 to outlet port 106. The nuts will then be fully torqued as in the previous embodiment, and when control valve 104 is returned to its left hand position, area 111 of valve 103 will be exhausted, shifting valve 103 upwardly in FIGURE 3 and therefore dumping area 108 of valve 102, returning valve 102 to the left.

Should one or more nuts become jammed on the stud threads before reaching their initially engaged position, $P_3$ will reach $P_2$ as before when the remaining nuts reach their initially engaged position, and valve 102 will be shifted to the right, applying high pressure $P_1$ to motor 13. Should $P_1$ be sufficient to dislodge the jammed nuts, air will begin to flow again through motor 13 as the dislodged nuts are again rotated. The pressure drop between port 106 of valve 102 and port 17 of motor 13 will cause $P_3$, which will previously have been the same as $P_1$ after valve 102 was shifted to the right, to be reduced to a value below $P_1$.

$P_4$ will meanwhile have been increased from $P_2$ to $P_1$ when valve 102 was shifted to the right. This will mean that $P_1$ will be applied to area 105 of valve 103. (This was not true in FIGURE 1, where $P_2$ was still applied to area 35 of valve 36 even after valve 22 shifted to the right.) The pressure drop between $P_4$ and $P_3$ will thus cause valve 103, which had been shifted downwardly when $P_3$ (and $P_4$) equaled $P_1$, to again shift upwardly in FIGURE 3.

This will dump area 108 of valve 102, shifting valve 102 to the left in FIGURE 3 and connecting port 106 to $P_2$. Low pressure will thus be applied to motor 13, and the dislodged nuts will be driven to their initially engaged position at low pressure rather than high pressure, preventing excessive torque from being exerted on them when they reach this position. Since $P_4$ will also become equal to $P_2$ when valve 102 shifts to the left, and since there is still a pressure drop between ports 106 and 17, $P_3$ will still be less than $P_4$, and valve 103 will remain in its upper position until the dislodged nuts reach their initial engaged position. At this point, valve 103 will again shift downwardly in FIGURE 3, shifting valve 102 to the right and again applying $P_1$ to motor 13 to finally torque the dislodged nuts. This will not affect the nuts already torqued, since $P_1$ will be the same as before.

Figure 4:
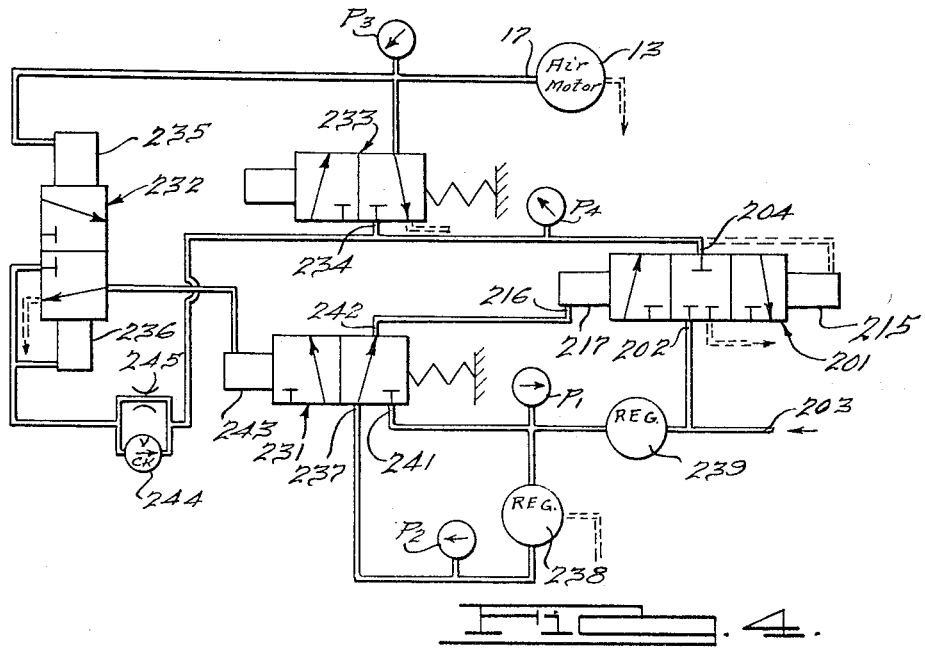
FIGURE 4 is a schematic view of another embodiment of the invention in which the pilot and selector valves operate through a self-relieving type of pressure regulator.
Figure 5:
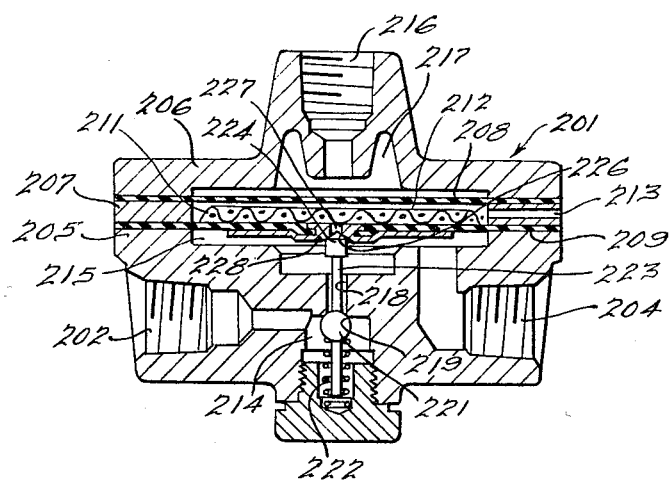
FIGURE 5 is a cross-sectional view in elevation of the self-relieving type of pressure regulator

FIGURES 4 and 5 illustrate another embodiment of the invention in which the variable source of fluid pressure comprises a self-relieving type of pressure regulator generally indicated at 201 which has an inlet port 202 supplied by a single source of pressure 203, but in which the pressure delivered from inlet port 202 to outlet port 204 is controlled by the setting of the regulator.

Regulator 201 is in itself of conventional construction and commprises a body 205, as seen in FIGURE 5, the body carrying a cover 206 and an intermediate member 207. A first diaphragm 208 is disposed between cover 206 and intermediate member 207, and a second diaphragm 209 between member 207 and body 205. These diaphragms are separated by a screen 211 or other porous member so that a chamber 212 is formed between the diaphragms, an exhaust port 213 extending through member 207 from chamber 212 to the atmosphere. Screen 211 also serves as a force-transmitting member between the diaphragms, so that both diaphragms move together.

Body 205 is provided with inlet port 202 leading to a chamber 214 and outlet port 204 leading from a chamber 215, whereas cover 206 is provided with a signal port 216, the latter port being connected to a chamber 217 above diaphragm 208.

Chambers 214 and 215 are connected by a vertically extending passage 218, the lower end of this passage having a valve seat 219 against which a spherical member 221 is urged by a spring 222. Member 221 is carried by a stem 223 which also carries a valve 224 at its upper end. Valve 224 is engageable with a valve seat 226 formed at the lower end of a passage 227 through a member 228 extending centrally through and secured to diaphragm 209. Passage 227 thus connects chamber 215 with exhaust chamber 212 when valve seat 226 is withdrawn upwardly from valve member 224.

The length of stem 223 between valve members 222 and 224 is such that depression of member 228 below its FIGURE 5 position will cause valve 221 to be lifted from valve seat 219, while maintaining a closed condition between valve member 224 and valve seat 226. On the other hand, should member 228 be lifted from its FIGURE 5 position, valve seat 226 will be lifted from valve member 224, while valve member 221 maintains contact with valve seat 219.

The area of diaphragm 208 exposed to chamber 217 is approximately equal to the area of diaphragm 209 exposed to chamber 215; in other words, the diaphragm area exposed to signal pressure is essentially equal to the area exposed to outlet pressure. The force of spring 222 is minimal and negligible with respect to the diaphragm force balance. The unbalance in the areas of valves 221 and 224 is also minimal, thus minimizing the effect of varying the inlet pressure at port 202 on the force balance system of regulator 201.

It will therefore be seen that given an inlet pressure at port 202 equal to or greater than the maximum required outlet pressure, a constant pressure will be maintained at outlet port 204, the amount of this pressure being proportioned to the signal pressure applied to port 216. With any given signal pressure exerting a downward force on diaphragms 208 and 209, and counteracted by the force of spring 222 and the pressure within chamber 215, an increase in pressure in chamber 215 will cause valve 221 to close and valve 224 to open, momentarily exhausting the pressure in chamber 215. This will cause diaphragms 208 and 209 to again descend in response to the pressure in signal chamber 217, closing exhaust port 224 and opening supply port 221. Should the signal pressure be increased, the point at which this changeover takes place will be at a higher pressure in chamber 215 and at port 204. Conversely, a reduction in signal pressure will result in a lower but regulated outlet pressure.

In the embodiment of FIGURE 4, the selector valve is generally indicated at 231, the pilot valve at 232 and the control valve at 233. Inlet port 234 of valve 233 is connected to outlet port 204 of regulator 201. One pressure area 235 of valve 232 is connected to inlet port 17 of motor 13, and the other pressure area 236 to outlet port 204 of valve 201. Pilot valve 232 will thus have the same function as valve 103 of the embodiment of FIGURE 3. That is, valve 232 will be responsive to a pressure differential between $P_3$ and $P_4$ should one or more nuts which become jammed before reaching their initial engaged position are dislodged upon initial application of high pressure to the air motor, and will return to a position causing low pressure to be reapplied to the air motor until the dislodged nuts reach their initially engaged position.

One inlet port 237 of valve 231 is supplied with a relatively low pressure $P_2$ by a regulator 238 supplied by common source 203. A high pressure regulator 239 controls supply of pressure to the second inlet port 241 of valve 231. Outlet port 242 of valve 231 is connected with signal port 216 of regulator 201 which supplies pressure to chamber 217.

In operation, assuming an initial condition of the parts as shown in FIGURE 4, selective movement of control valve 233 to the right will connect outlet port 204 of regulator 201 with port 17 of motor 13. Since a relatively low pressure $P_2$ is applied to chamber 217, regulator 201 will supply a relatively low pressure $P_4$ to motor 13. Nevertheless, the pressure drop from port 204 to port 17 will result in $P_3$ being substantially less than $P_4$, pilot valve 232 thus remaining in its position as shown in FIGURE 4.

When the nuts have reached their initially engaged position and air motor 13 stops, $P_3$ will attain the value of $P_4$, and pilot valve 232 will shift downwardly in FIGURE 4, pressurizing chamber 243 of selector valve 231 and shifting this valve to the right in FIGURE 4. This will connect high pressure $P_1$ to chamber 217, and the outlet pressure $P_4$ of regulator 201 will be substantially increased. This will cause full torque to be applied to the nuts. Upon selective return of control valve 233 to its left hand position in FIGURE 4, valves 232 and 231 will return to their initial positions.

The mechanics of the operation in FIGURE 4 to overcome jammed nuts and not run them home under high pressure, will be basically the same as that described with respect to FIGURE 3. That is, should $P_1$ be sufficient to dislodge the jammed nuts, air will begin to flow again through motor 13 as the dislodged nuts are again rotated. The pressure drop between port 204 of regulator 201 and port 17 of motor 13 will cause $P_3$, which will previously have been the same as $P_1$, to be reduced to a value below $P_1$.

$P_1$ being applied to area 236 of valve 232, this valve will be shifted upwardly, dumping area 243 of valve 231, shifting valve 231 to the left in FIGURE 4 and thus causing a relatively low pressure $P_2$ to be applied to chamber 217. This will cause regulator 201 to supply a relatively low pressure $P_4$ to motor 13.

It should be noted that regulators 238 and 239 in the embodiment of FIGURE 4 can be of small size and thus relatively inexpensive, since they are only used to supply chamber 217 and not for the main supply of air to motor 13. Similarly, selector valve 231 can be of relatively small size since it only handles the volume of air required for chamber 217.

A check valve 244 and a variable restriction 245 are connected in parallel with each other and between outlet port 204 of regulator 201 and area 236 of valve 232. The purpose of this arrangement is to retard the flow of $P_4$ when it becomes a relatively high pressure to area 236, and thus insure that valve 232 remains in its lower position.

Figure 6:
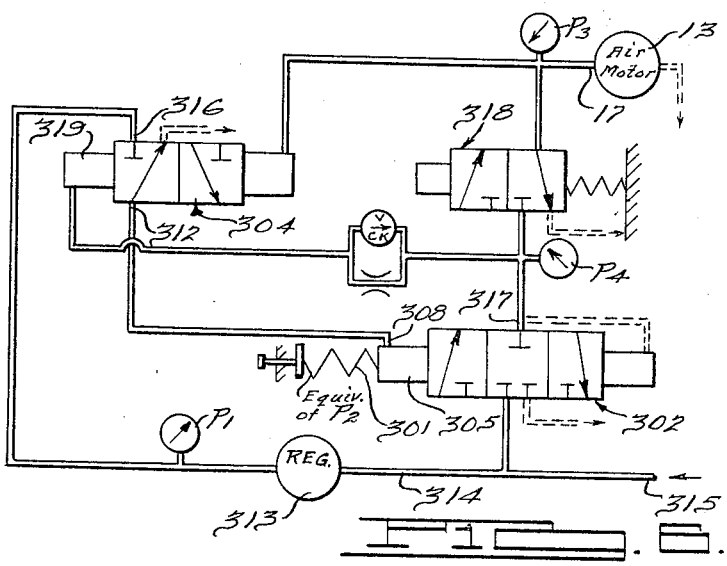
FIGURE 6 is a schematic view of still another embodiment of the invention which is similar to that of FIGURE 4 but in which the selector valve is eliminated.
Figure 7:
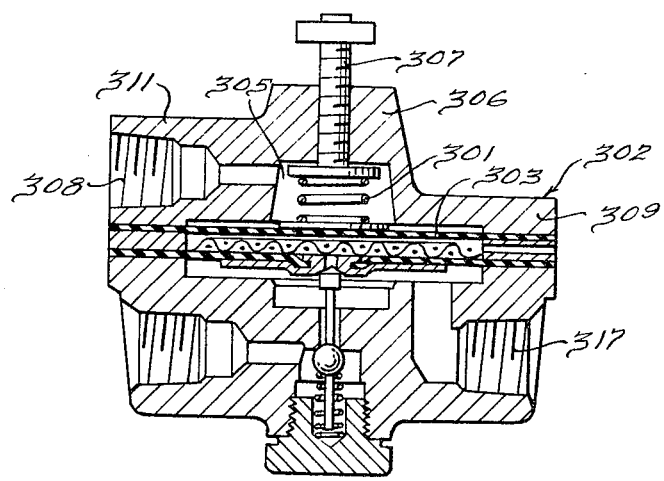
FIGURE 7 is a cross-sectional view in elevation of the self-relieving pressure regulator used in the embodiment of FIGURE 6.

FIGURES 6 and 7 illustrate a fourth embodiment of the invention which is basically similar to that of FIGURES 4 and 5 but differs therefrom in that a spring 301 is used in conjunction with the self-relieving type of pressure regulator generally indicated at 302, and provides a force on upper diaphragm 303 which is the equivalent of the force which relatively low pressure $P_2$ exerts in the embodiment of FIGURES 4 and 5. By substituting spring 301 for the regulator 238, it is possible to eliminate selector valve 231 and have the pilot valve, designated at 304 in FIGURE 6, connected directly to chamber 305 of regulator 302.

The regulator is constructed as shown in FIGURE 7, boss 306 having an adjusting screw 307 threadably mounted therein, the lower end of screw 307 being disposed within chamber 305 and supporting the upper end of spring 301, and the signal port 308 extending inwardly from the side of cover 309 through an enlarged portion 311 thereof, port 308 being connected to outlet port 312 of pilot valve 304.

A regulator 313 is provided, this regulator being disposed in a conduit 314 which connects a source of relatively high fluid pressure 315 with the inlet port 316 of pilot valve 304. Regulator 313 is set to deliver a pressure $P_1$ which is actually an intermediate pressure between the low pressure $P_2$ and the high pressure desired to set regulator 302 at a high pressure position. The reason $P_1$ is an intermediate pressure is that the force which it exerts on diaphragm 303 will be added to the force exerted by spring 301, the total force being that which will cause the desired high pressure to be delivered at outlet port 317 of regulator 302.

The fact that $P_1$ and spring 301 are additive will mean that whenever an adjustment is made in the strength of spring 301, thus adjusting the value of the low pressure at outlet 317, regulator 313 will have to be correspondingly adjusted if it is desired that the high pressure delivered at outlet port 317 remain the same. In the previous embodiments, it will be observed, each pressure value may be adjusted without affecting the other. The high pressure value will of course be the one which must be finely adjusted since it will control the final torque placed on the nuts.

In operation of the embodiment of FIGURES 6 and 7, with the parts in the initial position shown in FIGURE 6, rightward shifting of control valve 318 will cause relatively low pressure flow to motor 13, rotating the nuts to their initially engaged position. During this time, the pressure drop between $P_3$ and $P_4$ will maintain valve 304 in its right hand position as shown in FIGURE 6.

When the nuts arrive at their initially engaged position, $P_3$ will approach $P_4$ in value, causing leftward shifting of pilot valve 304 in FIGURE 6. This will connect $P_1$ to chamber 305 of regulator 302, increasing the outlet pressure of the regulator to a preselected relatively high value. Motor 13 will thus apply full tightening torque to the nuts. When control valve 318 is released, it will shift to the left in FIGURE 6, returning pilot valve 304 to its right hand position and dumping chamber 305 in readiness for another cycle. As in the previous embodiment, any jamming of one or more nuts before reaching their initially engaged position will not result in high pressure driving of such nuts to their home position after they have been dislodged by shifting of pilot valve 304 to its leftward or high pressure position. This is because area 319 of valve 304 is connected to outlet port 317 of regulator 302, and the pressure differential created between $P_3$ and $P_4$ when the jammed nuts are dislodged and begin to run down toward their initially engaged position will cause pilot valve 304 to return to its right hand position, resetting regulator 302 for low pressure.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In the pressure control system for a fluid motor, a fluid supply means having low pressure and high pressure settings, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, and means responsive to reduction of said pressure drop upon stalling of said motor for shifting said supply means to its high pressure setting.

2. In the pressure control system for a fluid motor, a fluid supply means having low pressure and high pressure settings, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, means responsive to reduction of said pressure drop upon stalling of said motor for shifting said supply means to its high pressure setting, and means responsive to return of said control valve to its initial position for returning said supply means to its low pressure setting.

3. In the pressure control system for a fluid motor, a fluid supply means having low pressure and high pressure settings, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, means responsive to reduction of said pressure drop upon stalling of said motor for shifting said supply means to its high pressure setting, means responsive to restarting of said motor while said supply means is at its high pressure setting and said control valve is in its shifted position for returning said supply means to its low pressure setting, and means responsive to return of said control valve to its initial position for returning said supply means to its low pressure setting.

4. In the pressure control system for a fluid motor, a fluid supply means having low pressure and high pressure settings, said supply means comprising a shiftable selector valve with a pair of alternately usable inlet ports, a first regulator supplying low pressure to one inlet port, a second regulator supplying high pressure to the second inlet port, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, and means responsive to reduction of said pressure drop upon stalling of said motor for shifting said supply means to its high pressure setting.

5. In the pressure control system for a fluid motor, a fluid supply means having low pressure and high pressure settings, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, and means responsive to reduction of said pressure drop upon stalling of said motor for shifting said supply means to its high pressure setting, said last-mentioned means comprising a differential pressure operated pilot valve having opposed pressure areas connected to said fluid motor and supply means respectively.

6. In the pressure control system for a fluid motor, a fluid supply means having low pressure and high pressure settings, said supply means comprising a shiftable selector valve with a pair of alternately usable inlet ports, a first regulator supplying low pressure to one inlet port, a second regulator supplying high pressure to the second inlet port, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, means responsive to reduction of said pressure drop upon stalling of said motor for shifting said supply means to its high pressure setting, said last-mentioned means comprising a differential pressure operated pilot valve having opposed pressure areas connected to said fluid motor and supply means respectively, and a pressure area on said selector valve connected to the outlet of said pilot valve.

7. In the pressure control system for a fluid motor, a fluid supply means having low pressure and high pressure settings, said supply means comprising a shiftable selector valve with a pair of alternately usable inlet ports, a first regulator supplying low pressure to one inlet port, a second regulator supplying high pressure to the second inlet port, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, and means responsive to reduction of said pressure drop upon stalling of said motor for shifting said supply means to its high pressure setting, said last-mentioned means comprising a differential pressure operated pilot valve having opposed pressure areas connected to said fluid motor and the outlet of said selector valve respectively.

8. In the pressure control system for a fluid motor, a fluid supply means having low pressure and high pressure settings, said supply means comprising a self-relieving type of pressure regulator, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, and means responsive to reduction of said pressure drop upon stalling of said motor for shifting said supply means to its high pressure setting.

9. In the pressure control system for a fluid motor, a fluid supply means having low pressure and high pressure settings, said supply means comprising a self-relieving type of pressure regulator and a selector valve having low and high pressure inlet ports and an outlet port, a signal port on said pressure regulator connected to said selector valve outlet port, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, and means responsive to reduction of said pressure drop upon stalling of said motor for shifting said supply means to its high pressure setting.

10. In the pressure control system for a fluid motor, a fluid supply means having low pressure and high pressure settings, said supply means comprising a self-relieving type of pressure regulator and a pilot valve having an outlet port, a signal port on said regulator connected to said last-mentioned outlet port, adjustable resilient means for creating a force in said regulator which is additive to the force created by pressure at said signal port, a regulator for controlling the supply to said pilot valve, means connecting said supply means and motor, a selectively operable control valve in said connecting means, means normally holding said supply means at its low pressure setting, shifting of said control valve causing fluid flow at low pressure from said supply means to said motor, whereby a pressure drop will be created between said supply means and motor, and means responsive to reduction of said pressure drop upon stalling of said motor for shifting said pilot valve so as to apply pressure to its outlet port.

11. In the pressure control system for a fluid motor, a fluid supply means having low and high pressure settings, means connecting said fluid supply means with said fluid motor, a control valve in said connecting means movable between supply and exhaust positions, a differential pressure operated pilot valve having one pressure area connected between said control valve and motor and an opposed pressure area connected to the outlet of said supply means, said pilot valve being movable from an exhaust position when the pressure on said second mentioned area is greater than that on said first-mentioned area to a supply position when the pressures on said areas are substantially equal, a regulated pressure supply for said pilot valve, and yieldable means holding said fluid supply means at its low pressure setting, the supply means being shiftable to its high pressure setting in response to movement of said pilot valve to its supply position.

12. The combination according to claim 11, said fluid supply means comprising a selector valve having low and high pressure inlet ports, an outlet port on said pilot valve, and a pressure area on said selector valve connected to said last-mentioned outlet port, whereby shifting of said pilot valve to its supply position will cause said selector valve to shift from its low pressure to its high pressure setting.

13. The combination according to claim 11, said fluid supply means comprising a self-relieving type of pressure regulator having a high pressure inlet port, a controlled pressure outlet port, and a signal port, a selector valve having low and high pressure inlet ports and an outlet port connected to said regulator signal port, means in said regulator for providing pressure at its outlet port proportional to the pressure at its signal port, an outlet port for said pilot valve, and a pressure area on said selector valve connected to said last-mentioned outlet port and responsive to pressure thereat for shifting the selector valve from its low to its high pressure setting.

14. The combination according to claim 11, said fluid supply means comprising a self-relieving type of pressure regulator having a high pressure inlet port, a controlled pressure outlet port and a signal port, an outlet port on said pilot valve connected to said regulator signal port, and adjustable means on said regulator for exerting a force which is additive to the force exerted by pressure at said signal port.

References Cited by the Examiner
UNITED STATES PATENTS

| | | | |
|---|---|---|---|
| 1,103,037 | 7/1914 | Clark | 91—29 |
| 2,356,366 | 8/1944 | Wise | 91—29 |
| 2,823,647 | 2/1958 | Meyer | 91—29 |
| 2,825,353 | 3/1958 | Voytech | 137—36 |
| 2,879,783 | 3/1959 | Taplin | 251—28 |
| 2,968,915 | 1/1961 | Feistel | 60—53 X |
| 3,131,722 | 5/1964 | Abbott | 137—625.69 X |

WILLIAM F. O'DEA, *Primary Examiner.*

CLARENCE R. GORDON, *Examiner.*